(12) United States Patent
Wright

(10) Patent No.: US 6,591,688 B2
(45) Date of Patent: Jul. 15, 2003

(54) LOAD SENSING BY PARTIAL MAGNETIC SATURATION

(75) Inventor: Hubert A. Wright, Winchester, MA (US)

(73) Assignee: Starr-Johnson, Winchester, MA (US)

( * ) Notice: Subject to any disclaimer, the term of this patent is extended or adjusted under 35 U.S.C. 154(b) by 0 days.

(21) Appl. No.: 09/911,773

(22) Filed: Jul. 24, 2001

(65) Prior Publication Data

US 2002/0124657 A1 Sep. 12, 2002

Related U.S. Application Data

(63) Continuation-in-part of application No. 09/801,362, filed on Mar. 7, 2001.

(51) Int. Cl.[7] ................................................. G01L 9/10
(52) U.S. Cl. .............................. 73/728; 73/722; 73/715
(58) Field of Search ........................ 713/728, 722, 713/715

(56) References Cited

U.S. PATENT DOCUMENTS

| 3,562,687 A | 2/1971 | Tavis |
| 3,643,156 A | 2/1972 | Stewart et al. |
| 3,693,445 A | 9/1972 | Johnson |
| 3,820,098 A | 6/1974 | Demyon et al. |
| 3,967,490 A | 7/1976 | Brady |
| 4,107,994 A | 8/1978 | Sogo |
| 4,174,638 A | 11/1979 | Zabler et al. |
| 4,193,291 A | 3/1980 | Lynnworth |
| 4,193,303 A | 3/1980 | Egnell |
| 4,339,955 A | 7/1982 | Iwasaki |
| 4,343,184 A | 8/1982 | Jaulmes |
| 4,393,715 A | 7/1983 | Lombard |
| 4,424,705 A | 1/1984 | Hattori et al. |
| 4,458,196 A | 7/1984 | Goyal et al. |
| 4,526,480 A | 7/1985 | Ward |
| 4,535,627 A | 8/1985 | Prost et al. |
| 4,545,245 A | 10/1985 | Sharp |
| 4,627,292 A | * 12/1986 | Dekrone ...................... 73/728 |

(List continued on next page.)

FOREIGN PATENT DOCUMENTS

| EP | 1239267 | 9/2002 |
| JP | 59174729 | 10/1984 |
| JP | 06281521 | 10/1994 |

*Primary Examiner*—Max Noori
*Assistant Examiner*—Jermaine Jenkins
(74) *Attorney, Agent, or Firm*—Cesari & McKenna, LLP

(57) ABSTRACT

A load applied to a load cell's load-bearing member (21) causes that member to move against the force applied by springs (28 and 30) and thereby bring a magnet (24) into closer proximity to the ferromagnetic core (12) of a coil (10). Acting across a small gap, the magnet partially saturates a magnetic circuit that encloses the coil. This force-caused magnet motion changes the coil inductance and the magnetic circuit's degree of saturation. By applying to the coil (10) a brief voltage pulse without thereby heating it significantly, and by observing the coil current's resultant steady-state value and the rate at which the coil current approaches that value, an inductance-to-load converter (FIG. 4) calculates the applied load and the coil's temperature and generates outputs that represent them.

41 Claims, 10 Drawing Sheets

U.S. PATENT DOCUMENTS

| | | | |
|---|---|---|---|
| 4,649,341 A | | 3/1987 | Ulbrich et al. |
| 4,719,362 A | | 1/1988 | Nest et al. |
| 4,740,726 A | | 4/1988 | Umezawa |
| 4,793,188 A | * | 12/1988 | Strasser et al. ............... 73/745 |
| 4,859,942 A | | 8/1989 | Charton et al. |
| 4,864,232 A | | 9/1989 | Redlich |
| 4,896,535 A | | 1/1990 | Duckart et al. |
| 4,920,796 A | | 5/1990 | Duckart et al. |
| 4,922,745 A | | 5/1990 | Rudkin et al. |
| 4,961,345 A | | 10/1990 | Tsuruoka |
| 5,035,140 A | | 7/1991 | Daniels et al. |
| 5,054,318 A | | 10/1991 | Lew |
| 5,074,148 A | | 12/1991 | Lew |
| 5,184,510 A | | 2/1993 | Rossman |
| 5,285,154 A | | 2/1994 | Burreson |
| 5,332,966 A | | 7/1994 | Berberich |
| 5,345,811 A | | 9/1994 | Alexandrovich, Sr. et al. |
| 5,351,004 A | * | 9/1994 | Daniels et al. ......... 324/207.13 |
| 5,359,902 A | | 11/1994 | Barger et al. |
| 5,383,349 A | | 1/1995 | Blake-Coleman |
| 5,534,853 A | | 7/1996 | Pioch |
| 5,569,866 A | | 10/1996 | Allison |
| 5,600,997 A | | 2/1997 | Kemp et al. |
| 5,743,138 A | | 4/1998 | Cheng |
| 5,929,391 A | | 7/1999 | Petrucelli et al. |
| 6,079,266 A | * | 6/2000 | Wright ........................ 73/299 |

* cited by examiner

LOAD SENSING BY PARTIAL MAGNETIC SATURATION

CROSS-REFERENCE TO RELATED APPLICATION

The present application is a continuation-in-part of commonly assigned copending U.S. patent application Ser. No. 09/801,362, which was filed on Mar. 7, 2001, by Hubert A. Wright for Fluid-Load Measurement by Magnetic Excitation and Vibration Sensing of a Fluid-Load-Sensitive Diaphragm and is hereby incorporated by reference.

BACKGROUND OF THE INVENTION

1. Field of the Invention

The present invention is directed to load transducers, particularly those of the type that infer loading from changes in magnetic coupling.

2. Background Information

Transducers of load—typically, force or pressure—sometimes infer loading from magnetic coupling. Typically, two members whose relative positions determine the magnetic coupling between them are resiliently mounted with respect to each other in such a manner that a load applied to the transducer causes a displacement between the members—and thus a magnetic coupling between them—that is indicative of the amount of loading. One approach that has enjoyed some popularity employs a coil wound about a high-magnetic-permeability core. The core is one part of a magnetic circuit resiliently mounted for movement with respect to another high-permeability part. That movement changes the size of a low-magnetic-permeability portion of the magnetic path so that the path's reluctance changes and thereby causes a measurable change in the coil's inductance. Because of the resilient mounting, loading can be inferred from inductance.

Another approach to employing magnetic coupling for load measurement is exemplified by the arrangement described in U.S. Pat. No. 4,627,292 to Dekrone. A permanent magnet is resiliently mounted with respect to a core. The core is a ferromagnetic toroid about which two coils are so wound that the core provides magnetic coupling between them. Loading causes the magnet to move in a path, with which the magnet is aligned, that is generally perpendicular to the core's axis. The magnet causes a degree of saturation in the core—and thus in the degree of magnetic coupling between the coils—that depends on the magnet's position. Loading can therefore be inferred by sensing the signal caused in one coil when the other coil is driven; i.e., the load determination can be based on the relationship between mutual inductance and load.

The Dekrone arrangement requires at least three-wire connections, and load transducers must often be disposed in locations where connection space is at a premium. So one may be inclined to adapt to load sensing the position-detection approach that U.S. Pat. No. 5,285,154 to Burreson describes. In one embodiment described in that patent, a permanent magnet is aligned with and displaced along a path that lies approximately on the axis of a coil wound about a ferromagnetic core. The magnet's motion results in saturation changes in the core, and position is inferred from the coil's inductance. This approach yields the sensitivity advantages of a saturation-type transducer, but it requires only a two-wire connection.

SUMMARY OF THE INVENTION

I have developed a partial-saturation-type load transducer that can be so configured as to achieve a higher sensitivity to load-caused displacement than similar-sized transducers of the Dekrone or Burreson type exhibit. In accordance with my invention, high-permeability material extends through most of the length of the path followed by most of the magnetic flux that the coil generates, but that path includes a relatively small gap, and the magnet is disposed in that gap. The transducer is so arranged that the magnet's proximity to at least part of the path's high-permeability segment responds resiliently to loading. This results in a change in the degree of core saturation, so the load can be inferred from the coil's inductance. In contrast to the Burreson patent, this approach tends to afford relatively low reluctance, since the magnetic path consists largely of high-permeability material. But, in contrast with the Dekrone arrangement, the path includes a gap in which the permanent magnet can be disposed generally in alignment with the path so as to maximize the coupling between the magnet and the path. Employing my approach thus tends to afford enhanced transducer sensitivity to a given load-caused displacement.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
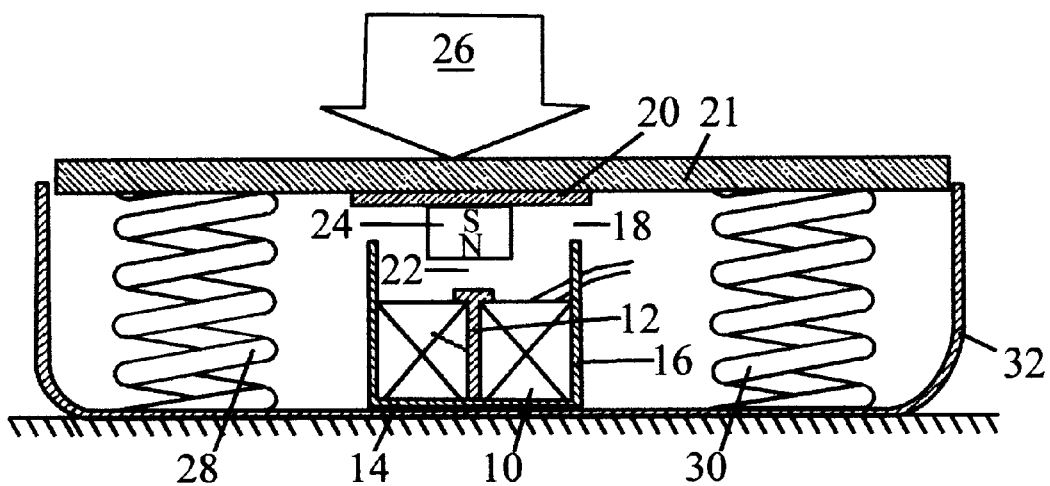
FIG. 1 is a diagram of a load cell that can be employed in implementing the present invention.

FIG. 1 diagrammatically illustrates a load call employed in one embodiment of the present invention. A coil 10 is wound about a central core piece 12 consisting essentially of high-magnetic-permeability material. By high-permeability, I mean a material whose magnetic permeability is at least fifty times that of free space. Although that material is highly permeable, it is also saturable, so its incremental permeability falls to a relatively low value when the magnetic flux density within it exceeds a certain value. This saturability is employed for load detection in a manner that will be described in due course.

The central core section is part of a magnetic path that, through a majority of its length, passes through high-permeability material. In particular, flux caused by current flowing through a coil 10 tends to flow through the central core 12, radially outward through a bottom disk 14, axially upward through a ferromagnetic cylindrical can 16 and across an annular gap 18, radially inward through a moveable ferromagnetic top disk 20, and through a gap 22 formed by the core 12 and the top disk 20 and including within it a permanent magnet 24. So high-permeability material occupies most of the path. To afford the advantages of one of the present invention's aspects, the length of the high-permeability path portion should be at least five times that of the low-permeability portion when the load cell in unloaded. As a perusal of FIG. 1 reveals, such an arrangement can provide the coil with good magnetic shielding. Also, the magnet should be aligned with the magnetic path as it is in the diagram; i.e., the current-induced flux that goes through the magnet should principally flow generally in the direction between that magnet's poles rather than transversely of the path between the poles.

The low-magnetic-permeability portion of the path in the FIG. 1 embodiment consists of two gaps, namely, the peripheral gap 18 and the central gap 22. The total length of this low-magnetic-permeability path portion depends on the spacing between the top plate 20 and the upper ends of cylindrical can 16 and central core piece 12. A load-bearing member 21, to which the top plate 20 is secured, is resiliently mounted with respect to the remainder of the magnetic path's high-magnetic-permeability portion, as the drawing employs springs 28 and 30 mounted on a base 32 to illustrate. So the top plate 20's spacing—and thus the low-permeability path portion's length—depend on the load 26 applied to the top plate 20 through member 21. (Member 21 may be made of high-magnetic-permeability material, too, but this is not a requirement.)

As FIG. 1's load cell is increasingly compressed by the application of force 26 (and the opposing force that some support surface would typically apply to base 32), the magnet 24's increasing proximity to the central core 12 increases the (ferromagnetic) core's saturation and thereby reduces the coil 10's inductance. As will be explained in more detail below, an inductance-to-load converter makes a measurement of an inductance-dependent quantity that depends on this inductance, and it infers the load value from that quantity. For this reason, the load cell's various components should be so chosen as to make that inductance relatively sensitive to magnet position throughout the load cell's range of operation. In one embodiment that I employ, I have achieved this sensitivity by making the rest gap between the magnet and the core approximately equal to the magnet's thickness, i.e., to the distance between its north- and south-pole faces. This relationship is not required, but I do prefer that the total length of the path's low-permeability portions be no more than four times the magnet's thickness. It is also preferable for the lengths of the two gaps 18 and 22 to be approximately equal.

Figure 2:
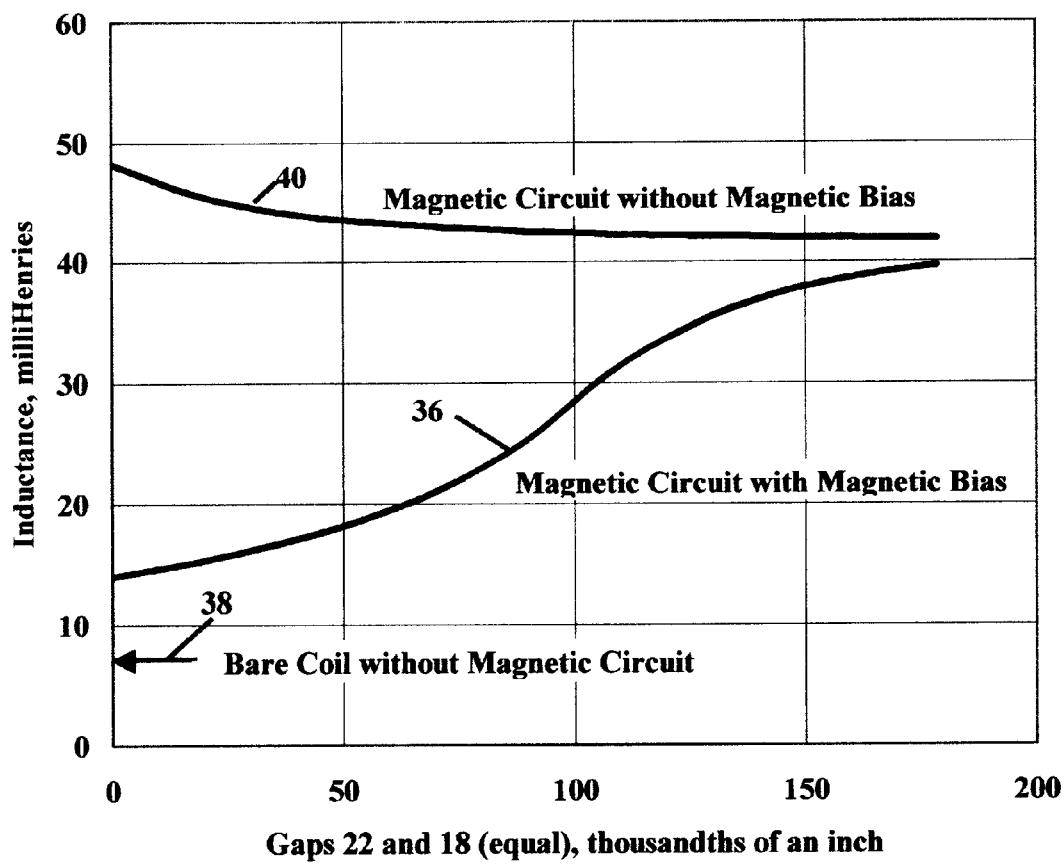
FIG. 2 is a plot of the inductance of FIG. 1's coil as a function of the position of its magnet.

FIG. 2 includes a curve 36 that represents the coil's inductance as a function of the magnet's distance from the central core segment in the above-mentioned prototype. As that drawing shows, the flux path in the experimental prototype was highly saturated when no gap was left between the magnet and the central core segment: the remaining inductance exceeded by only a little the value, indicated by arrow 38, that would have resulted if the coil had simply been operated in the absence of high-permeability path material. When the magnet is moved away from the central core by a distance roughly equal to twice the magnet's thickness, on the other hand, total gap length exclusive of the magnet is four times the magnet's thickness, and the core becomes nearly unsaturated: the inductance approaches the value, represented by curve 40, that would have resulted from the same, high-permeability-material magnetic circuit in the absence of any bias at all from a permanent magnet.

Figure 3:
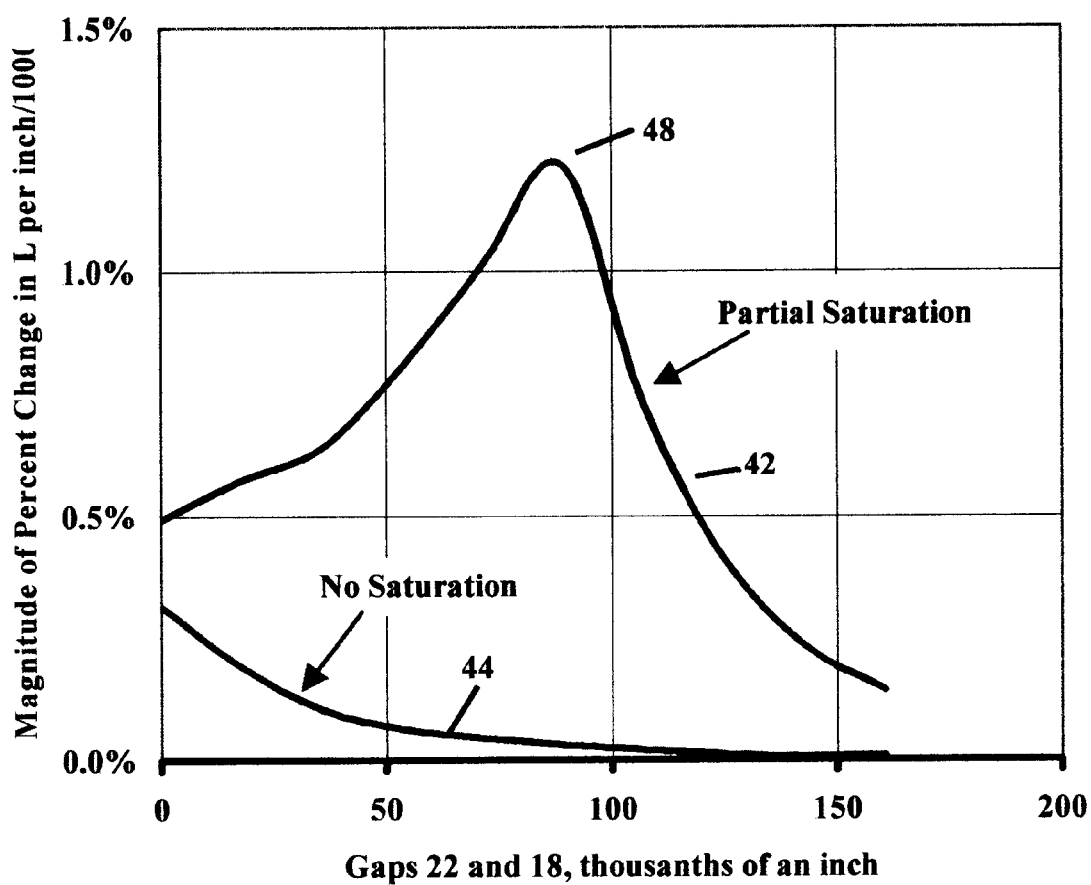
FIG. 3 is a plot of that inductance's sensitivity to magnet position.

As FIG. 3 shows, use of the permanent magnet to produce varying degrees of saturation makes inductance quite sensitive to displacement, and that sensitivity extends over a relatively wide range. Specifically, curve 42 represents the prototype's percentage change in inductance per thousandth of an inch, and curve 44 represents the inductance change that would be caused if the only changes were in the size of the flux path's low-permeability portion, i.e., if high-permeability non-magnetic material were substituted for the magnet. As the drawing shows, the inductance variation caused only by gap-size changes is in most of the range minuscule in comparison with the changes that partial-saturation effects can produce.

Figure 4:
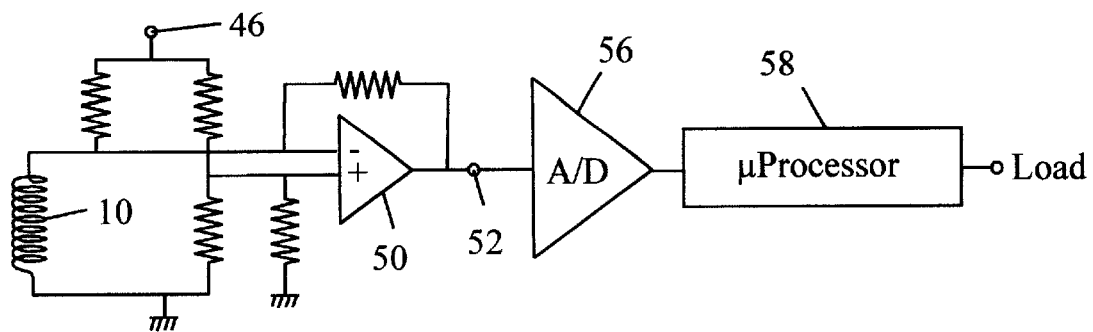
FIG. 4 is a schematic diagram of an inductance-to-load circuit that can be used in practicing the present invention's teachings.

The particular manner in which embodiments of the present invention infer load from the coil's inductance is not critical to the present invention's broader teachings, but FIG. 4 depicts a circuit that employs my preferred approach. It shows an inductance-to-load converter so connected to the coil 10 that the coil acts as one leg of a standard Wheatstone bridge. Periodically—say, every second or two—circuitry not shown applies a voltage step to the bridge's excitation point 46. In the illustrated embodiment, this step's voltage is −0.33 volt and persists for 3.5 msec, as FIG. 5's top trace indicates. Because of coil and other circuit resistances, the resultant rate of current increase decays to an essentially constant level well before the end of the voltage pulse. Preferably, the additional magnetic flux caused by the coil current level is no more than, say, 10% of the maximum bias flux that the permanent magnet causes.

Figure 5:
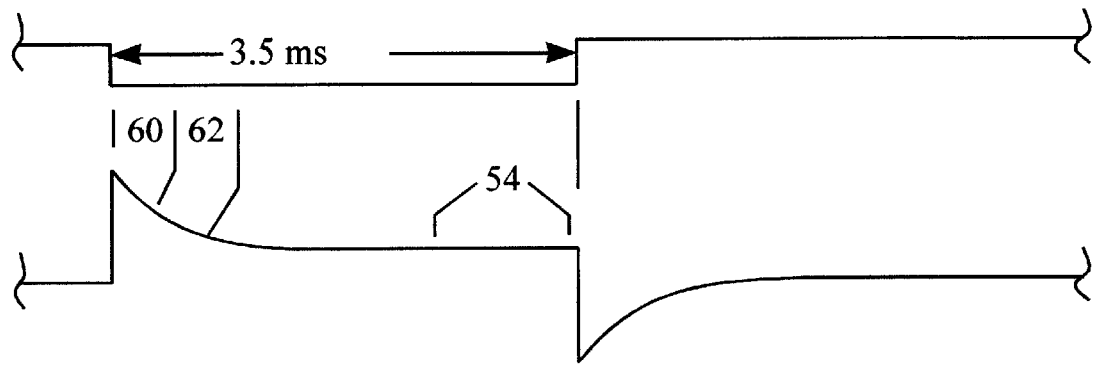
FIG. 5 are plots of an excitation signal applied to the coil and of an analog signal that the circuit of FIG. 4 produces in response.

Because the coil circuit is both inductive and resistive, the output that a differential amplifier 50 produces at measurement point 52 undergoes a transient event and then stabilizes at an essentially constant level, as FIG. 5's lower trace indicates, during time interval 54. Interval 54 is the time interval during which the coil current maintains its above-mentioned essentially constant maximum value.

An analog-to-digital converter 56 takes 100,000 samples of the output per second, beginning at the onset of bridge excitation, and it delivers the resultant digital values to a microprocessor or other digital processing circuit 58. That circuit computes an inductance-dependent quantity from which it infers the load that the load cell is experiencing. This involves separately averaging the samples taken during time segment 54 and further time segments 60 and 62. Time segments 60 and 62 are sequential, and segment 60 begins with the first waveform sample. In my experiments, I have chosen time segments 60 and 62 so that their total duration equals a typical expected time constant of the coil's inductance/resistance combination. In the illustrated embodiment, for example, time segments 60 and 62 were chosen to be thirty-two sample intervals each in duration because a typical L/R time constant in the illustrated embodiment is approximately 640 microseconds.

To remove the steady-state component of these averages and thereby leave only the transient part, the microprocessor 58 subtracts from the segment-60 and segment-62 averages the average of the samples taken during time segment 54. If the resultant quantities are a and b for time segments 60 and 62, respectively, the ratio b/a can be used to characterize the (presumably exponential) transient decay. It can be shown that the time constant $t_c$ of the coil current's exponential decay—which is dependent on the coil's inductance—is related to that ratio in the following way:

$$t_c = t_1 / \ln(a/b),$$

where $t_1$ is the duration of time segment 30 (or time segment 32). By thus using ratios and averages, the system makes a measurement that is independent of amplitude and tends to suppress noise.

Although the ratio b/a depends on inductance, which, as was just explained above, is load-dependent, it also depends on resistance, which is a temperature-dependent quantity. As will become apparent, this temperature dependence is useful, but suppressing it makes b/a a better inductance indicator. To that end, the microprocessor 58 can employ a compensation function based on the fact that the segment-54 average depends on the coil's (temperature-dependent) resistance. The compensation function will have been determined during calibration by observing b/a changes that result from varying the temperature without changing the load. (The term calibration here is not intended to suggest that the function-determining data must be taken for every sensor system made. Although it can be, it will be more typical for the data to be taken for one or a representative sample of a given design's instances, and the resultant function will then be included in all sensors made in accordance with that design.) From such observations, a plot is made, as a function of the (temperature-indicating) average segment-54-sample value c, of the ratio between the observed b/a value and the b/a value at a segment-54 average corresponding to a reference temperature.

Figure 6:
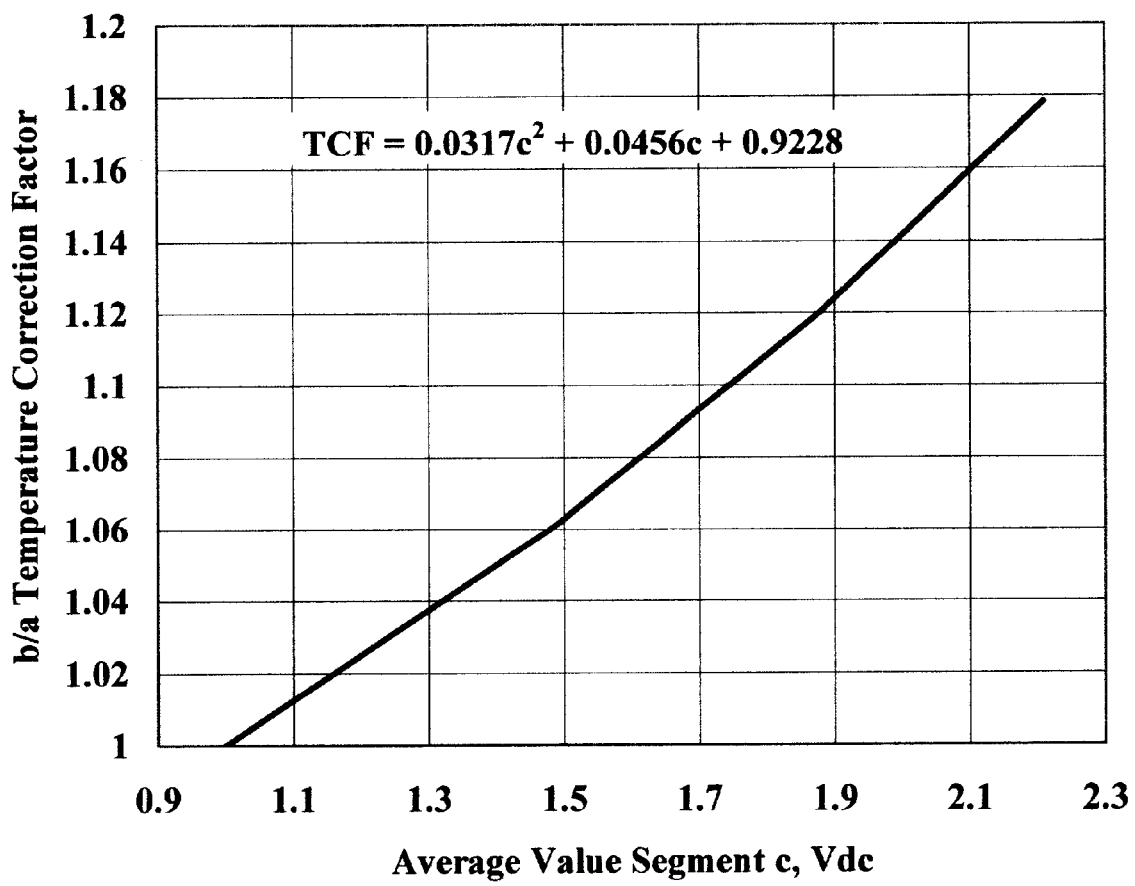
FIG. 6 is a plot of an adjustment factor used by the circuit of FIG. 4 to suppress dependence on temperature.

FIG. 6 shows a typical relationship thus determined for a constant force. By employing the polynomial that best fits the measured data, the ratio b/a measured at any expected temperature can be corrected computationally to a reference temperature, such as the temperature that corresponds to the value c=1. In the illustrated embodiment, that temperature is approximately 20° Celsius. Of course, some other reference temperature can be employed instead, but a prudent choice is the expected average temperature at which the system is to be used. To eliminate temperature effects, the computer multiplies the measured ratio b/a by the temperature-correction factor ("TCF") shown. As FIG. 6 illustrates, applying that factor yields the following result:

$$(b/a)_1 = (0.0317c^2 + 0.0456c + 0.9228)(b/a),$$

where b/a is the measured ratio, c is the average segment-54-sample value, and $(b/a)_1$, is the ratio corrected to the c=1 reference value.

Figure 7:
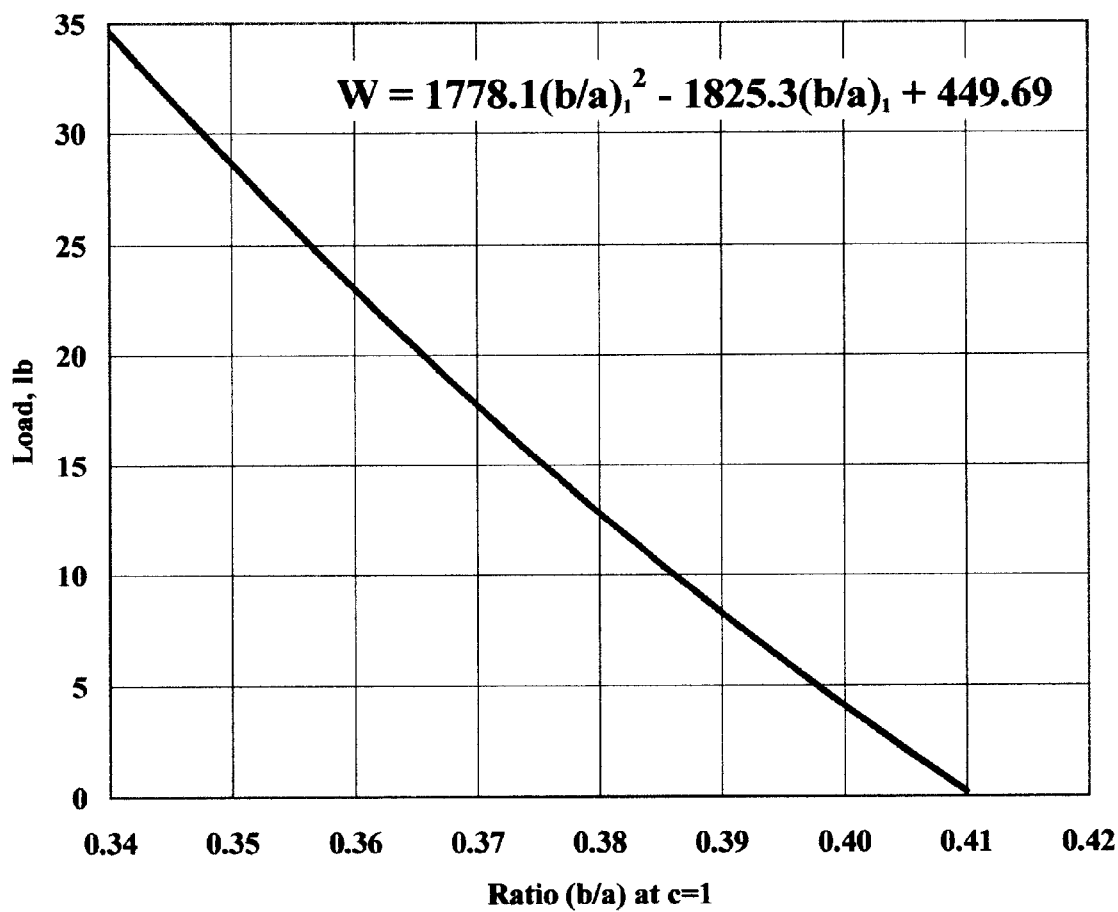
FIG. 7 is a plot that relates weight to an inductance-dependent quantity that the circuit of FIG. 4 computes.

The load can then be computed from the temperature-corrected ratio $(b/a)_1$, in accordance with a best-fit polynomial approximation to previously obtained calibration data. FIG. 7 depicts the following typical polynomial result for a case where the load to be determined is a weight:

$$W = 1778.1(b/a)_1^2 - 1825.3(b/a)_1 + 440.69.$$

Here W is the weight in pounds.

Figure 8:
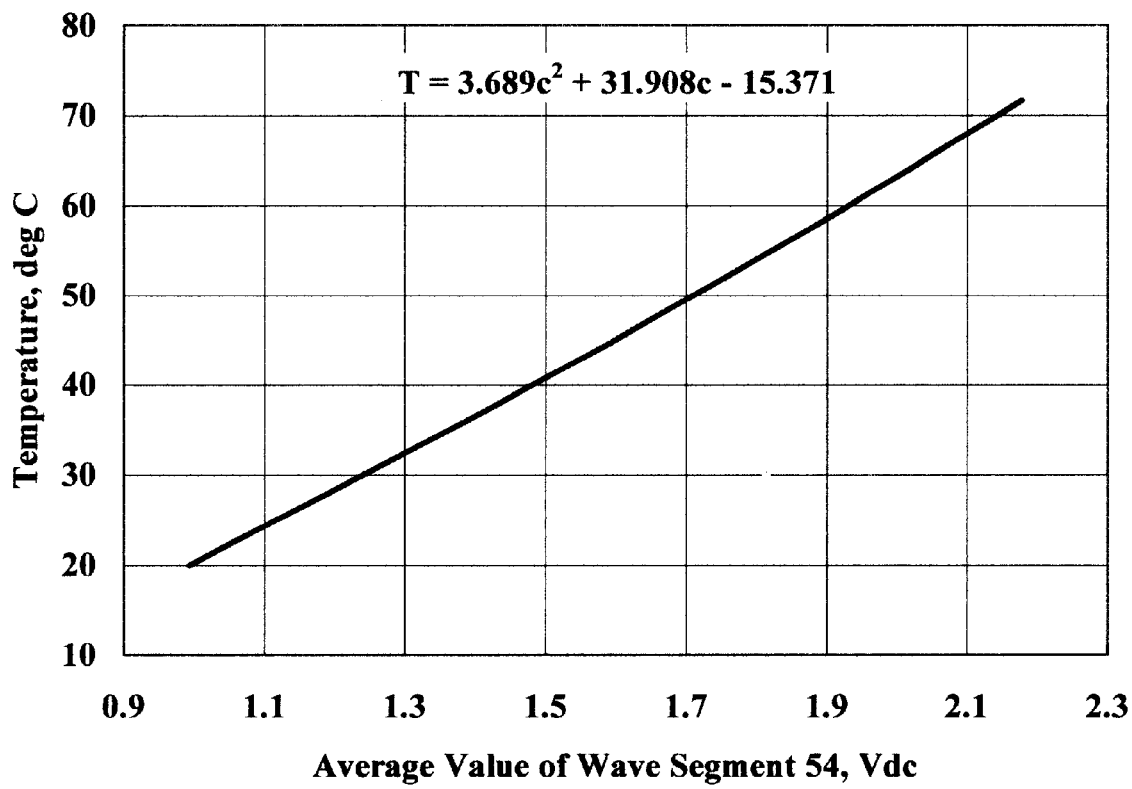
FIG. 8 is a plot that relates temperature to a measured resistance-dependent quantity.

Now, there are many applications in which a control system that employs the present invention's load measurement will also require a temperature measurement. In some cases, for instance, the present invention may be used to measure a liquid's static-pressure head in order to determine its depth. The liquid's density may depend on temperature, however, so a temperature measurement may have to be part of the depth determination. Another example occurs in refrigeration systems, in which the present invention can be employed to measure coolant pressure. It is important in many such applications for the control system to "know" the amount if refrigerant that can be absorbed in the lubricant. Refrigerant solubility depends on both pressure and temperature. The measurement approach just described lends itself particularly to such applications, because the average c of the measurements in FIG. 5's segment 54 is related to coil temperature, as was observed above. If the coil is disposed in thermal communication with the material or environment whose temperature is of interest, that temperature can be inferred from the value of c, and an output indicative of that temperature can be generated. FIG. 8 is a plot of that value's relationship to temperature in one of the invention's embodiments.

As was mentioned above, it is preferable for the coil drive to be small. This is additionally beneficial in those applications in which temperature is to be measured in the fashion just described. Specifically, the drive current should be low enough that its effect on the coil temperature is negligible. In a prototype that I have employed, for example, the heat dissipation in the coil was approximately one microwatt. Whether it actually has to be that low depends on the application, but I prefer for the resultant temperature change to be less than 0.1° C.

Figure 9:
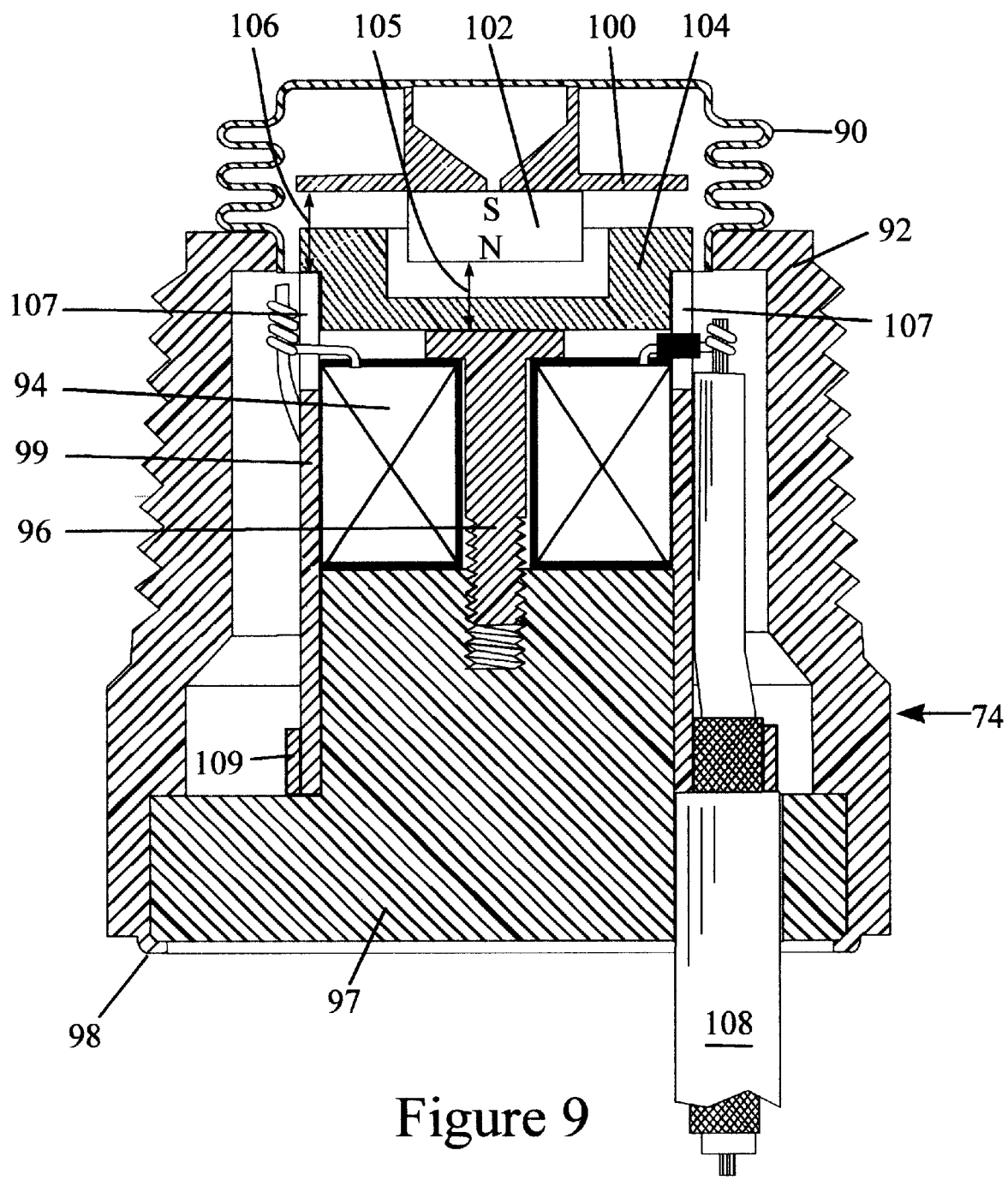
FIG. 9 is a cross-sectional view of an alternate embodiment of the sensor assembly, one employed to measure pressure.

FIG. 9 shows in more detail a sensor assembly 74 employed in an embodiment of the invention that can be used to make a pressure measurement. The above-described Wright patent application describes using such an assembly to infer mass loading from the frequency of such an assembly's vibration, and the Wright application describes using a pressure-measurement output to compensate for the effects that static pressure has on the relationship between mass loading and vibration frequency.

The sensor assembly 74 includes a diaphragm 90 supported by a sensor housing 92 to which it is attached by solder or brazing. The housing forms the exterior threads by which the assembly can be mounted. The diaphragm 90 is shown as a hydro-formed element, but it can be fabricated in some other fashion; it can be a welded bellows, for instance. The preferred embodiment's diaphragm material is beryllium copper, but numerous suitable alternative materials are applicable. In some embodiments it may also be desirable to use a mechanical spring to augment the diaphragm's elastic properties, particularly if the bellows is made of a material such as phosphor bronze or stainless steel.

A coil 94, which corresponds to FIG. 1's coil 10, may include, say, 1400 turns of #38 magnet wire wound on a bobbin secured by a magnetically permeable retaining screw 96, such as a #4–40 steel screw, to a magnetically permeable base member 97 retained by a rolled or crimped lip 98 that the sensor housing 92 forms. A magnetically permeable sleeve 99, preferably having a 0.028-inch-(0.071-cm-) thick steel wall, surrounds the coil 94. A magnetically permeable pedestal 100 is welded, soldered, or similarly attached to the inside of the diaphragm 90. This pedestal forms a face that may, for example, be a 0.563-inch-(1.430-cm-) diameter steel disk having a thickness of 0.020 inch (0.051 cm).

A permanent magnet 102 corresponding to FIG. 1's magnet 24 is mounted on the pedestal's face. The magnet may, for instance, be a 0.25-inch (0.64-cm) diameter neodymium-iron-boron axially magnetized disk whose thickness is 0.1 inch (0.3 cm). Other rare-earth, high-field-strength magnets having high Curie temperatures are also suitable. Acceptable materials for the magnetically permeable components include metals having substantial iron content, such as soft iron and carbon steel. A non-magnetic mechanical stop 104 protects the diaphragm from excessive deformation by stopping the pedestal 100 and magnet 102 before external pressure deforms the diaphragm too far toward the coil 94. The bellows diaphragm's elastic properties determine the maximum permissible bellows stroke, which may be of the order of 0.020 to 0.040 inch (0.051 to 0.102 cm).

Base 97, sleeve 99, pedestal 100, magnet 102, and retaining screw 96 form a magnetically biased magnetic circuit in which the magnet 102 is nested co-axially with the coil 94 and separated from it by a sensing gaps 105 and 106. The flux path spans the approximately 0.1 inch (0.3 cm) gap 105 between the tip of the magnet 102 and the top of the retaining screw 96 and the gap 106 between the tip of the pedestal 100 and the top edge of the coil retaining sleeve 99. With this configuration, the coil inductance is relatively sensitive to the magnet 102's position. Small slots 107 in each side of the retaining sleeve 99 permit connections between the coil and a cable 108's conductors. A strain-relief clamp 109 secures the cable 108 to the sensor body.

The cable 108 extends through a hole in the base 97 and runs between the coil 94 and computation circuitry largely the same as that of FIG. 4. Since the illustrated embodiment uses only the coil for all measurements, a simple coaxial cable is all that is required.

Figure 10:
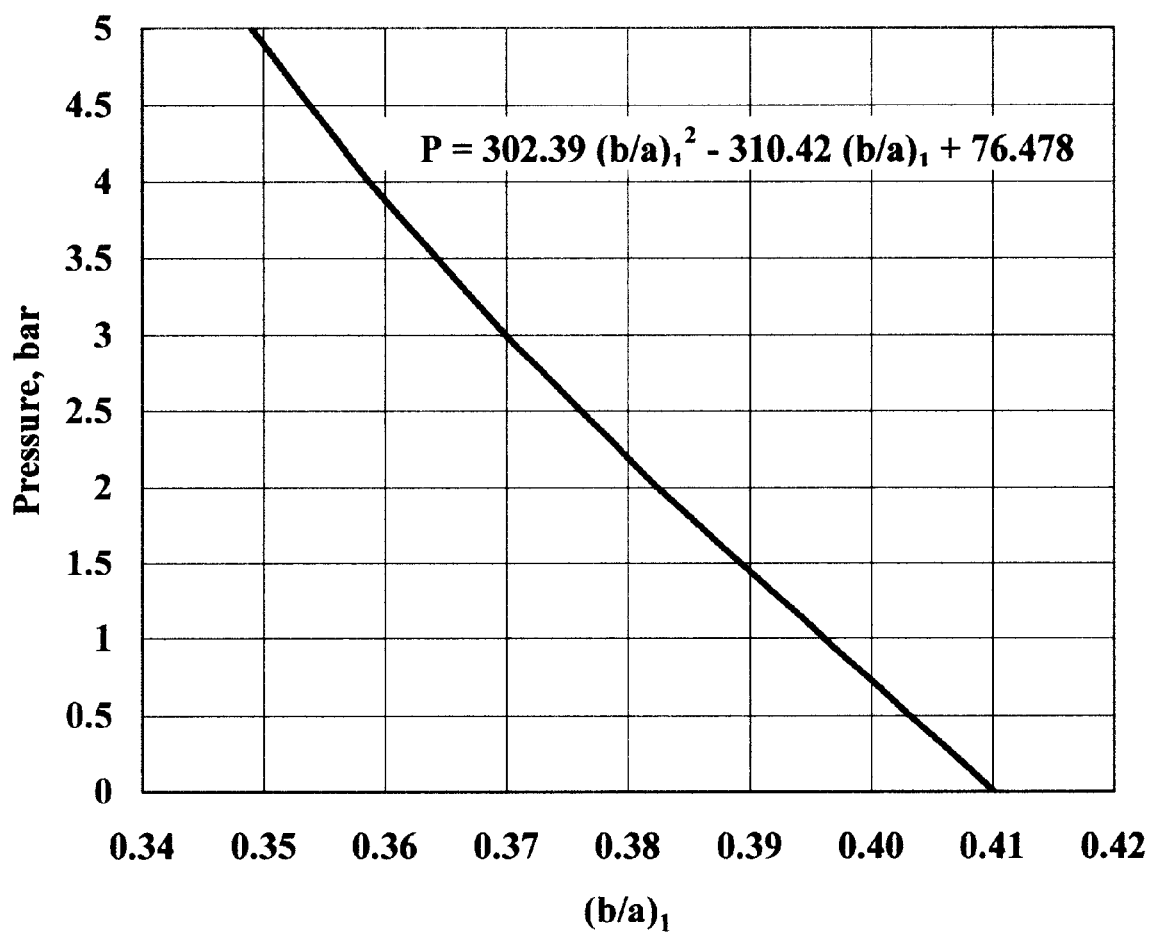
FIG. 10 is a plot that is similar to that of FIG. 7 but relates pressure rather than weight to the inductance-dependent quantity.

The sensor of FIG. 9 is used to infer static pressure from the bridge-circuit response in the manner described above in connection with FIGS. 1–7, with the exception that the weight formula of FIG. 7 is replaced with the similarly determined pressure formula, which FIG. 10 depicts.

Although I have found considerable practical advantage in using numerically sampled digitized data for the calculation of the output variables and correction factors, the present invention's teachings can be implemented by using other techniques, too.

FIG. 1 depicts the magnet 24 as mounted on a part of the high-permeability flux path that is moveable with respect to the coil. Although I prefer this arrangement, the magnet could instead be mounted on, say, the central core 12 so that it is stationary with respect to the coil but varies in its proximity to the top disk 20. Indeed, one can conceive of arrangements in which the magnet is so suspended between stationary and moveable parts of the path as to have its proximity to both of them vary.

Figure 11:
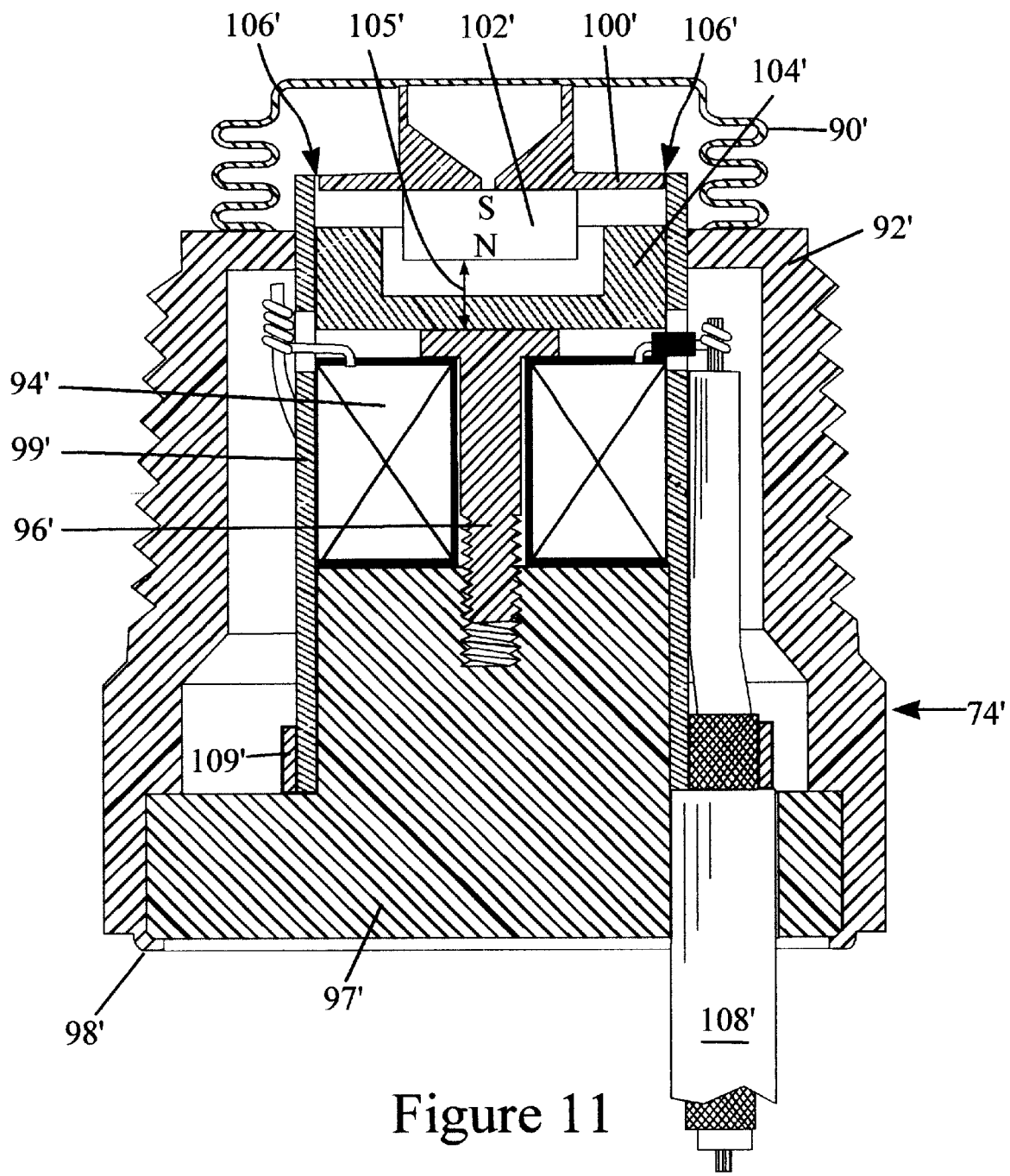
FIG. 11 is a diagram, similar to FIG. 9, of an alternate embodiment of the present invention that uses virtually complete magnetic shielding and a single internal gap.

Additionally, although I have found it relatively easy to fabricate the illustrated embodiment, in which the low-permeability portion of the path consists of central and peripheral gaps interrupting the path's high-permeability portion, there may be some applications in which it is preferable to employ more gaps or only a single gap. Consider the arrangement of FIG. 11, for instance. In that drawing, primed reference numerals refer to elements that perform the function of the elements identified by corresponding unprimed reference numerals in FIG. 9, and corresponding elements are largely identical, with the exception that an upwardly extending shell 99' leaves only a vestigial outer gap 106'. This arrangement enhances the assembly's magnetic shielding, although the coil inductance's sensitivity to gap change may not be as good as in the arrangement of FIG. 9.

In short, the present invention can be practiced in a wide range of embodiments and thus constitutes a significant advance in the art.

What is claimed is:

1. A load transducer comprising:
    A) a load cell including:
        i) a high-permeability path material forming an at least partially saturable high-permeability path portion of a closed magnetic path in which the high-permeability portion is interrupted by a relatively low-permeability path portion shorter than the high-permeability portion;
        ii) a permanent magnet generally aligned with the path and mounted in the low-permeability path portion for such resilient relative movement between the magnet and at least part of the high-permeability path portion upon application of load to the load cell as to change the degree of magnetic saturation of the magnetic path, the total length of the low-permeability path portion, exclusive of the magnet, being less than four times the thickness of the magnet in the path direction; and
        iii) an electrically conductive coil so linked to the magnetic path that the inductance of the coil depends on the reluctance of the magnetic path, whereby the inductance of the coil depends on the load applied to the load cell; and
    B) an inductance-to-load converter, connected to the coil, that measures a coil-inductance-dependent quantity, determines the load from the coil-inductance-dependent quantity, and generates an output indicative of the load thereby determined.

2. A load transducer as defined in claim 1 wherein the inductance-to-load converter so drives the coil that the resultant change in the magnetic-flux density of the magnetic path is less than ten percent of the maximum magnetic-flux density caused in the magnetic path by the magnet.

3. A load transducer as defined in claim 1 wherein the high-permeability path material includes a stationary section, which is stationary with respect to the coil, and a movable section, which is movable with respect thereto.

4. A load transducer as defined in claim 3 wherein the magnet is secured to the movable section.

5. A load transducer as defined in claim 3 wherein:
    A) the stationary section includes:
        i) a center stationary-section portion, about which the coil is wound; and
        ii) a peripheral stationary-section portion disposed radially outward of the coil,
    B) the movable portion includes a first end piece disposed axially beyond a first end of the center stationary-section portion and forms therewith a center gap included in the low-permeability path portion.

6. A load transducer as defined in claim 5 wherein the first end piece forms with the peripheral stationary-section section a peripheral gap included in the low-permeability path portion.

7. A load transducer as defined in claim 1 wherein the proximity of the magnet to at least a part of the high-permeability path portion increases with load.

8. A load transducer as defined in claim 1 wherein the length of the high-permeability path portion is at least five times the length of the low-permeability path portion.

9. A load transducer as defined in claim 1 wherein the inductance-to-load converter determines the load from the coil-inductance-dependent quantity by:
    A) measuring a quantity dependent on temperature;
    B) determining a temperature-correction factor from the quantity dependent on temperature; and
    C) determining the load from the temperature-correction factor and the coil-in-ductance-dependent quantity.

10. A load transducer as defined in claim 9 wherein the inductance-to-load converter drives the coil with less than enough current to raise the temperature of the coil by 0.1° C.

11. A load transducer as defined in claim 9 wherein the inductance-to-load converter:
   A) measures the constant-stimulus response of the coil; and
   B) determines the quantity dependent on temperature from the constant-stimulus response of the coil.

12. A load transducer as defined in claim 11 wherein:
   A) the inductance-to-load converter applies a step stimulus to the coil; and
   B) the constant-stimulus response from which the inductance-to-load converter determines the quantity dependent on temperature is the portion of the step response that occurs after the transient response of the coil substantially dies out.

13. A load transducer as defined in claim 12 wherein:
   A) the inductance-to-load converter takes a plurality of samples of the portion of the step response that occurs after the transient response of the coil substantially dies out; and
   B) the quantity dependent on temperature is a quantity proportional to the total of the samples thus taken.

14. A load transducer as defined in claim 1 wherein the inductance-to-load converter measures the transient response of the coil to obtain the coil-inductance-dependent quantity.

15. A load transducer as defined in claim 14 wherein the inductance-to-load converter so drives the coil that the resultant change in the magnetic-flux density of the magnetic path is less than ten percent of the maximum magnetic-flux density caused in the magnetic path by the magnet.

16. A load transducer as defined in claim 14 wherein:
   A) the inductance-to-load converter takes plurality of samples during each of a first and a second time segment, each of which occurs during the transient response of the coil, and determines first and second totals, respectively, of the samples taken during the first and second segments; and
   B) the coil-inductance-dependent quantity is a function the first and second totals.

17. A load transducer as defined in claim 16 wherein the inductance-to-load converter so drives the coil that the resultant change in the magnetic-flux density of the magnetic path is less than ten percent of the maximum magnetic-flux density caused in the magnetic path by the magnet.

18. A load transducer as defined in claim 16 wherein:
   A) the inductance-to-load converter applies a step stimulus to the coil;
   B) the samples taken during the first and second time segments are samples of an initial portion of the response of the coil to the step stimulus;
   C) the inductance-to-load converter takes a plurality of samples of the step response during a third time segment, which occurs after the transient response of the coil substantially dies out; and
   D) the coil-inductance-dependent quantity is a ratio of:
      i) the difference between a quantity proportional to the total of the samples taken during the third time segment and a quantity proportional to the total of the samples taken during one of the first and second time segments to:
      ii) the difference between a quantity proportional to the total of the samples taken during the third time segment and a quantity proportional to the total of the samples taken during the other of the first and second time segments.

19. A load transducer as defined in claim 14 wherein the inductance-to-load converter determines the load from the coil-inductance-dependent quantity by:
   A) measuring a quantity dependent on temperature;
   B) determining a temperature-correction factor from the quantity dependent on temperature; and
   C) determining the load from the temperature-correction factor and the coil-in-ductance-dependent quantity.

20. A load transducer as defined in claim 19 wherein the inductance-to-load converter:
   A) measures the constant-stimulus response of the coil; and
   B) determines the quantity dependent on temperature from the constant-stimulus response of the coil.

21. A load transducer as defined in claim 1 wherein the inductance-to-load converter drives the coil with less than enough current to raise the temperature of the coil by 0.1° C.

22. A load transducer as defined in claim 21 wherein the inductance-to-load converter:
   A) measures a quantity dependent on the resistance of the coil; and
   B) generates a temperature-indicating output from the quantity dependent on the resistance of the coil.

23. A load transducer as defined in claim 22 wherein the inductance-to-load converter:
   A) measures the constant-stimulus response of the coil; and
   B) determines the quantity dependent on the resistance of the coil from the constant-stimulus response of the coil.

24. A load transducer as defined in claim 1 wherein the inductance-to-load converter:
   A) measures a quantity dependent on the resistance of coil; and
   B) generates a temperature-indicating output from the quantity dependent on the resistance of the coil.

25. A load transducer as defined in claim 24 wherein the inductance-to-load converter:
   A) measures the constant-stimulus response of the coil; and
   B) determines the quantity dependent on the resistance of the coil from the constant-stimulus response of the coil.

26. A load transducer comprising:
   A) a load cell including:
      i) a high-permeability path material forming an at least partially saturable high-permeability path portion of a closed magnetic path in which the high-permeability portion is interrupted by a low-permeability path portion, the length of the high-permeability path portion being at least five times the length of the low-permeability path portion;
      ii) a permanent magnet generally aligned with the path and mounted in the low-permeability path portion for such resilient relative movement between the magnet and at least part of the high-permeability path portion upon application of load to the load cell as to change the degree of magnetic saturation of the magnetic path; and
      iii) an electrically conductive coil so linked to the magnetic path that current flowing through the coil induces in the magnetic path a magnetic flux that depends on the reluctance of the magnetic path, whereby the inductance of the coil depends on the load applied to the load cell; and
   B) an inductance-to-load converter, connected to the coil, that measures coil-inductance-dependent quantity, determines the load from the coil-inductance-dependent quantity, and generates an output indicative of the load thereby determined.

27. A load transducer as defined in claim 26 wherein the inductance-to-load converter so drives the coil that the resultant change in the magnetic-flux density of the magnetic path is less than ten percent of the maximum magnetic-flux density caused in the magnetic path by the magnet.

28. A load transducer as defined in claim 26 wherein the high-permeability path material includes a stationary section, which is stationary with respect to the coil, and a movable section, which is movable with respect thereto.

29. A load transducer as defined in claim 26 wherein the inductance-to-load converter determines the load from the coil-inductance-dependent quantity by:
  A) measuring a quantity dependent on temperature;
  B) determining a temperature-correction factor from the quantity dependent on temperature; and
  C) determining the load from the temperature-correction factor and the coil-in-ductance-dependent quantity.

30. A load transducer as defined in claim 26 wherein the in-ductance-to-load converter measures the transient response of the coil to obtain the coil-inductance-dependent quantity.

31. A load transducer as defined in claim 26 wherein the inductance-to-load converter drives the coil with less than enough current to raise the temperature of the coil by 0.1° C.

32. A load transducer as defined in claim 26 wherein the inductance-to-load converter:
  A) measures a quantity dependent on the resistance of the coil; and
  B) generates a temperature-indicating output from the quantity dependent on the coil's resistance.

33. A method for measuring load comprising:
  A) providing a load cell that includes:
    i) a high-permeability path material forming an at least partially saturable high-permeability path portion of a closed magnetic path in which the high-permeability portion is relatively long and interrupted by a relatively small low-permeability path portion;
    ii) a permanent magnet generally aligned with the path and mounted in the low-permeability path portion for such resilient relative movement between the magnet and at least part of the high-permeability path portion upon application of load to the load cell as to change the degree of magnetic saturation of the magnetic path, the length of the low-permeability path portion, exclusive of the magnet, being less than four times the thickness of the magnet in the path direction; and
    iii) an electrically conductive coil so linked to the magnetic path that current flowing through the coil induces in the magnetic path a magnetic flux that depends on the magnetic reluctance of the path, whereby the inductance of the coil depends on the load applied to the load cell;
  B) measuring a coil-inductance-dependent quantity;
  C) determining the load from the coil-inductance-dependent quantity; and
  D) generating an output indicative of the load thereby determined.

34. A method as defined in claim 33 wherein the measuring of the coil-inductance-dependent quantity includes so driving the coil that the resultant change in the magnetic-flux density of the magnetic path is less than ten percent of the maximum magnetic-flux density caused in the magnetic path by the magnet.

35. A method as defined in claim 33 wherein the measuring of the coil-inductance-dependent quantity includes so driving the coil that the current flowing through the coil is less than enough to raise the temperature of the coil by 0.1° C.

36. A method as defined in claim 33 wherein the length of the high-permeability path portion is at least five times the length of the low-permeability path portion.

37. A method as defined in claim 36 wherein the measuring of the coil-inductance-dependent quantity includes so driving the coil that the resultant change in the magnetic-flux density of the magnetic path is less than ten percent of the maximum magnetic-flux density caused in the magnetic path by the magnet.

38. A method as defined in claim 36 wherein the measuring of the coil-inductance-dependent quantity includes so driving the coil that the current flowing through the coil is less than enough to raise the temperature of the coil by 0.1° C.

39. A method for measuring load comprising:
  A) providing a load cell that includes:
    i) a high-permeability path material forming an at least partially saturable high-permeability path portion of a closed magnetic path in which the high-permeability portion is relatively long and interrupted by a relatively small low-permeability path portion, the length of the high-permeability path portion is at least five times the length of the low-permeability path portion;
    ii) a permanent magnet generally aligned with the path and mounted in the low-permeability path portion for such resilient relative movement between the magnet and at least part of the high-permeability path portion upon application of load to the load cell as to change the degree of magnetic saturation of the magnetic path; and
    iii) an electrically conductive coil so linked to the magnetic path that current flowing through the coil induces in the magnetic path a magnetic flux that depends on the reluctance of the magnetic path, is whereby the inductance of the coil depends on the load applied to the load cell;
  B) measuring a coil inductance-dependent quantity;
  C) determining the load from the coil-inductance-dependent quantity; and
  D) generating an output indicative of the load thereby determined.

40. A method as defined in claim 39 wherein the measuring of the coil-inductance-dependent quantity includes so driving the coil that the resultant change in the magnetic-flux density of the magnetic path is less than ten percent of the maximum magnetic-flux density caused in the magnetic path by the magnet.

41. A method as defined in claim 39 wherein the measuring of the coil-inductance-dependent quantity includes so driving the coil that the current flowing through the coil is less than enough to raise the temperature of the coil by 0.1° C.

* * * * *